No. 702,454. Patented June 17, 1902.
W. M. MINER.
ELECTRIC SYNCHRONOUS APPARATUS.
(Application filed July 25, 1901.)
(No Model.)
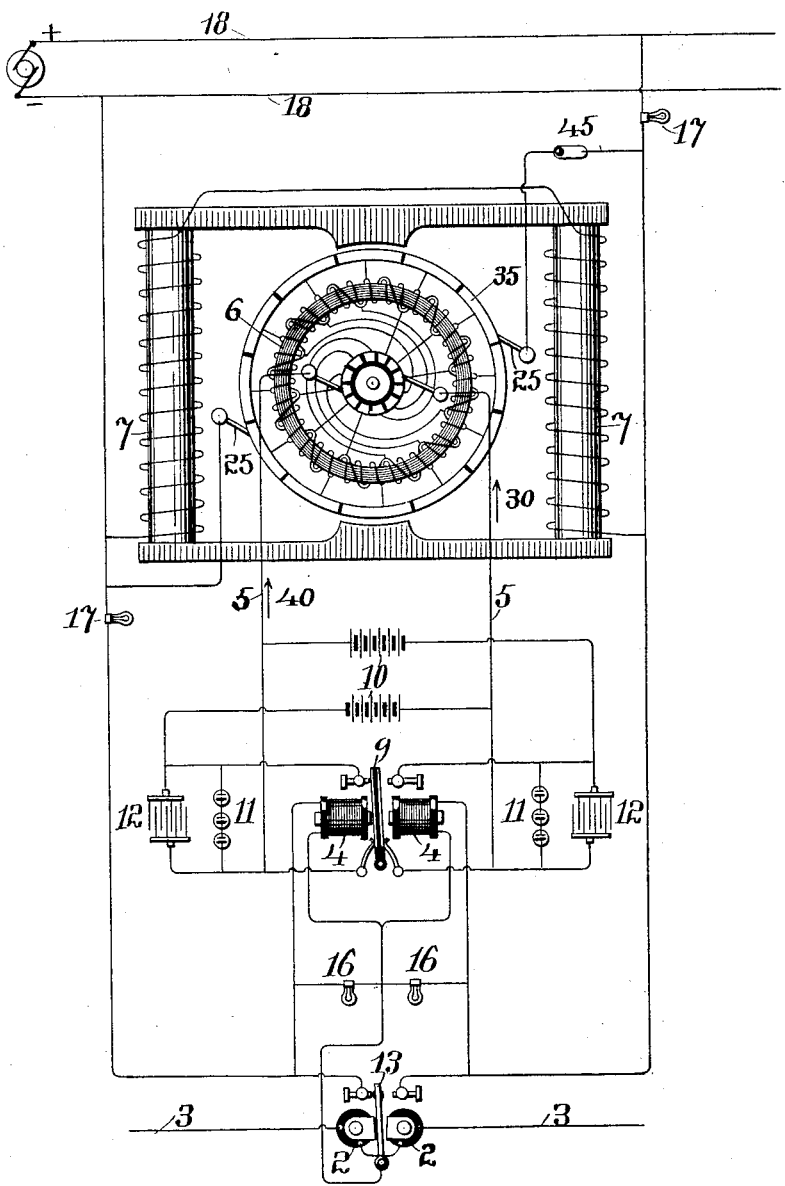
Witnesses:
Otto Greenberg
Ethel L. Lawler
Inventor
Willard M. Miner
By
H. C. Townsend
Attorney

UNITED STATES PATENT OFFICE.

WILLARD M. MINER, OF PLAINFIELD, NEW JERSEY.

ELECTRIC SYNCHRONOUS APPARATUS.

SPECIFICATION forming part of Letters Patent No. 702,454, dated June 17, 1902.

Application filed July 25, 1901. Serial No. 69,644. (No model.)

*To all whom it may concern:*

Be it known that I, WILLARD M. MINER, a citizen of the United States, and a resident of Plainfield, in the county of Union and State of New Jersey, have invented certain new and useful Improvements in Electric Synchronous Apparatus, of which the following is a specification.

My invention relates to synchronizing apparatus for telegraphic, telephonic, and other purposes, and more particularly to apparatus designed to operate in connection with an electric motor for keeping said motor running in synchronism with a distant appliance.

The object of my invention is to simplify the arrangements of apparatus heretofore employed for this purpose, to diminish the number of separate generators which it is necessary to employ, to permit the use of motors having a large torque and operated by heavy currents, and to secure other advantages.

To these ends my invention consists in the novel combinations of apparatus hereinafter set forth, and then specified in the claims.

In carrying out my invention the vibrator which I employ and which is made to follow the movements of the relay employed in the combination is kept in operation by an arrangement of devices such as is described in an application for patent filed by me of even date herewith, Serial No. 69,643.

Referring to the accompanying drawing, wherein I have shown diagrammatically a general arrangement of apparatus embodying my invention, 3 indicates a main line which includes the coils 2 of a polarized relay whose tongue 13 serves to bring the magnets 4 4 of a vibrator alternately into action, so as to cause a vibrator-tongue 9 to vibrate in synchronism with the tongue 13 and with the reversals of current upon the controlling-line 3.

18 indicates electric supply-wires leading from any suitable source of electric power, and the magnets 4 are included in a circuit from one wire to the other, as may be readily traced in the diagram. From the junction of the two coils 4 a wire or connection is taken to the vibrating tongue 13, and the two opposite contact-stops of said tongue are also connected to the outside terminals of the magnet-circuit, as shown. When the tongue vibrates, it acts to alternately shunt the current of the supply-wires 18 from the magnets 4 in turn, so that they will be energized alternately and cause the tongue 9, which carries armatures for said magnets, to vibrate in synchronism with the tongue 13, all as described in my copending application for patent. Incandescent lamps 16 may be placed in shunt or branches around the contacts of the relay 13, as shown, to operate as spark-preventing devices in the manner described in said application.

The fields of the motor which are to be run in synchronism with the distant appliance are indicated by the numeral 7, while 6 indicates the armature of said motor. The fields 7 are maintained by current derived from the power-circuit 18 and are in a branch in multiple with that which supplies the vibrator-magnets 4. Suitable lamps 17 may be placed, as shown, to cut down the voltage of the current supplied from wires 18 and render the same suitable for operating magnets 4 and for energizing the fields of the motor.

The armature of the electric motor herein shown is wound after the manner described in the patent No. 428,222 and illustrated in Fig. 4 of said patent, and the circuit-wires which supply the reversed currents to said armature are indicated by the numeral 5.

The reversed currents required for synchronism are produced by a double battery or generator 10. Current from the two portions 10 is caused to flow alternately over the connection 5 in opposite directions by the action of the vibrator-tongue 9, which is a split tongue, as shown, the two halves of which control, respectively, the connections of the two batteries 10 with the circuit 5, placed as a shunt or branch to the two portions of the vibrator by making contact, respectively, with contact-stops connected also to said batteries in the manner shown. When the tongue 9 is against one contact—as, for instance, the left-hand contact—circuit may be readily traced from the lower of the two batteries or generators through connection 5 in the direction of the arrow 30 and back to the opposite pole of said battery through the tongue 9 and contact-stop. When the tongue 9 is against the opposite contact, current passes from the upper of the two batteries 10 through connection 5 in the direction of the arrow 40. If the current thus flowing is a synchronizing as well as a power current for the motor, the energy supplied by the batteries or generators 10 must be considerable, and the sparking at the contacts of the circuit-changing vibrator will be so heavy as to produce liability to sticking. I obviate this difficulty and reduce the voltage of the batteries by giving to them the sole function of control and by providing the armature with an additional winding, which operates as a starting and a power winding combined and which may be supplied from the power-circuit 18 or from any other suitable source and in shunt with the operating-magnets of the vibrator. The commutator-brushes and commutator-cylinder of such additional winding are indicated by the numerals 25 and 35, respectively. The windings of the armature connected to the commutator 35 may be any suitable windings adapted to operate with continuous current and to produce a continuous torque of the armature. As shown, this continuous current or starting-winding is supplied in a branch in multiple with that which supplies the fields and the operating-magnets 4 of the vibrator.

It is obvious that instead of using a double-wound armature, one winding for synchronizing and the other for power, a double armature might be employed. If desired, a suitable switch may be employed in the connection for the power winding or armature, whose commutator and brushes are indicated by the numerals 25 and 35. Such a switch is indicated at 45. Suitable liquid and plate condensers 11 and 12 may be placed in shunts around the contacts of the vibrator.

The connection of the circuit 5 as a branch or shunt around the two parts of the vibrator to secure reversals of current through a single armature-winding by the action of the vibrator, as herein described, is the subject of claims in my application for patent filed of even date herewith, Serial No. 69,642, and is only shown for the purpose of illustrating one of the arrangements of switching and circuit-changing appliances to which my present invention is applicable.

What I claim as my invention is—

1. The combination substantially as described with a synchronous motor, of a main-line relay in a synchronizing-circuit, an electromagnetic vibrator having its operating-magnets in circuits leading from a suitable electric-power circuit through the contacts of the relay, an armature-winding for the motor, two local batteries and connections from the same to the contacts of the vibrator adapted as described to cause a reversal of current-flow in the armature-winding by the action of said batteries alternately, and a separate armature-winding supplied from the electric-power circuit in multiple with the operating-magnets of the vibrator.

2. In a synchronizing apparatus for an electric motor, the combination substantially as described of a main-line relay, an electromagnetic vibrator, a power-circuit supplying energy to the vibrator magnets through the contacts of the relay, a synchronizing-circuit on the motor-armature, a local battery or generator from which currents are made to flow alternately in opposite directions through the said synchronizing-winding by the action of the vibrator, an independent armature-circuit for the motor, a field-winding therefor and connections for supplying said independent armature and field with current from the power-wire in multiple with the operating-magnets of the vibrator.

3. In a synchronizing apparatus for an electric motor, the combination substantially as described of a main-line relay in the synchronizing-circuit, a vibrator having a number of operating-magnets brought into action alternately through the vibration of the relay, a synchronizing-circuit on the armature of the motor, two or more local generators or sections of generator connected alternately into the circuit of the armature over the contacts of the vibrator to cause reversals of current-flow thereon, an independent power-winding on the armature, an electric-power circuit supplying current continuously in the same direction to the commutator of said power-winding, and a field-magnet for the motor supplied in multiple with said armature power-winding from the power-circuit.

Signed at New York, in the county of New York and State of New York, this 26th day of June, A. D. 1901.

WILLARD M. MINER.

Witnesses:
DELBERT H. DECKER,
ETHEL L. LAWLER.